C. N. OUTERBRIDGE.
DEMOUNTABLE RIM.
APPLICATION FILED APR. 14, 1917.
1,243,624.
Patented Oct. 16, 1917.
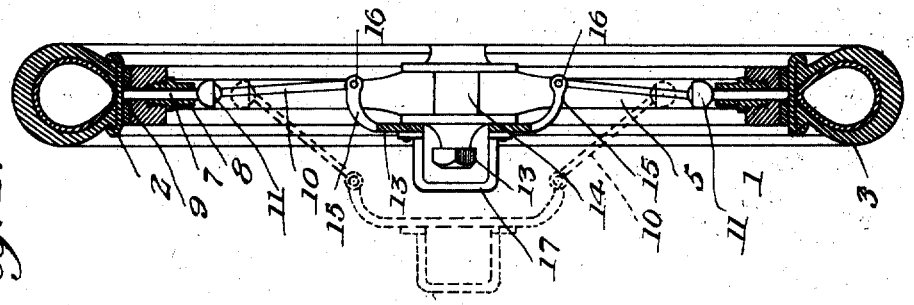
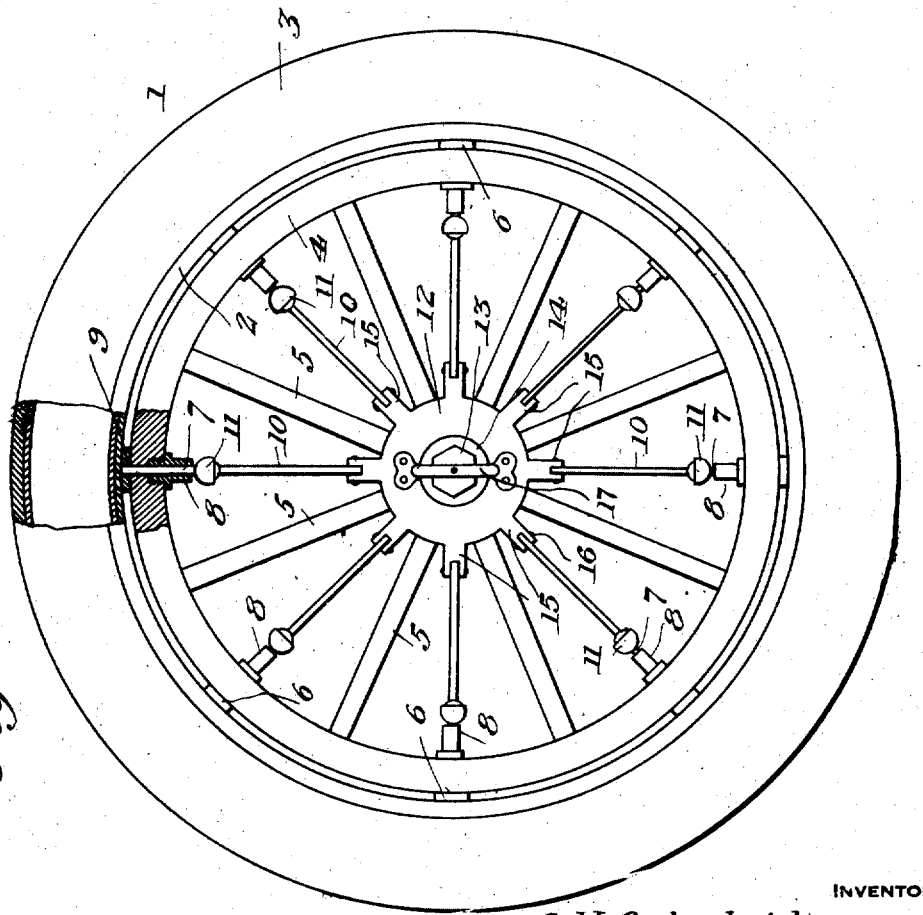
WITNESSES
INVENTOR
C. N. Outerbridge.
BY Victor J. Evans
ATTORNEY

UNITED STATES PATENT OFFICE.

CYRIL NORTON OUTERBRIDGE, OF CHARLOTTESVILLE, VIRGINIA.

DEMOUNTABLE RIM.

1,243,624.   Specification of Letters Patent.   Patented Oct. 16, 1917.

Application filed April 14, 1917. Serial No. 162,083.

*To all whom it may concern:*

Be it known that I, CYRIL NORTON OUTERBRIDGE, a citizen of the United States, residing at Charlottesville, in the county of Albemarle and State of Virginia, have invented new and useful Improvements in Demountable Rims, of which the following is a specification.

My invention relates to demountable rims and has for its objects; first, to provide a simple and efficient means for securing a demountable rim upon a wheel, the structure of said means being such that it may be instantaneously withdrawn from engagement with the rim, second, to provide a securing means for a demountable rim which lies substantially within the plane of the wheel when the rim is secured upon the wheel thereby, and thirdly, to provide a securing means for a demountable rim which may be operated instantaneously by the manual actuation of one centrally disposed member.

With these and other objects in view which will be hereinafter fully described and particularly pointed out in the claims, the invention consists in the novel construction and arrangement of parts illustrated in the accompanying drawings forming a part of this specification, in which:—

Figure 1 is a side elevation of a wheel provided with a demountable rim and securing means embodying my invention, Fig. 2 is a top partial sectional elevation of the mechanism illustrated in Fig. 1.

Like characters of reference indicate like parts in the various views.

In the drawings 1 designates generally a vehicle wheel upon which a demountable rim 2 is adapted to be secured. The demountable rim 2 is formed to engage a tire 3 of usual construction with side flanges formed thereon. The outer circumference of the felly 4 of the wheel is somewhat smaller in diameter than the inner surface of the demountable rim 2. At points intermediate adjacent spokes 5 of the wheel blocks 6 are secured upon the inner surface of the rim 2 whereby the rim is properly centered upon the wheel. A series of radially disposed pins 7 are slidably mounted in guides 8 mounted on the felly of the wheel, each pin lying in the plane of the spokes and having its outer end adapted to engage a depression 9 in its respective block 6. A toggle rod 10 is provided for each pin and has its outer end connected to the inner end of its respective pin by means of a ball and socket joint 11. An annular locking member or spider 12 is provided and is disposed centrally of the wheel and on the outside thereof, the aperture thereof allowing said locking member to pass over the central extended axle portion 13 of the hub 14 of the wheel. The inward movement of the locking member is restricted by the inner surface thereof abutting the outer surface of the hub 14, as shown in Fig. 2. A series of spring arms 15 are formed upon the outer periphery of the locking member 12, there being one arm for each toggle rod 10. The spring arms 15 are curved to extend inwardly and laterally of the plane of the wheel so that when the locking member abuts the surface of the hub the free ends of said spring arms are positioned inwardly of the axes of the pins 7 and in the plane of the spokes 5. The free ends of the spring arms 15 are pivotally connected with the inner ends of the toggle rods 10, as designated at 16. A handle 17 is secured to the outer surface of the locking member 12 and is U-shaped and extends across the aperture of the locking member and over the extended axle portion 13 whereby the locking member may be easily moved.

In the operation of the device, when it is desired to release the rim from the wheel the locking member 12 is pulled outwardly by means of the handle 17 to a position as designated by dotted lines in Fig. 2. This movement of the locking member moves the inner ends of the spring arms outwardly over the centers of the axes of the pins, thus releasing the locking action of the toggle mechanism. Upon further outward movement of said locking member the pins 2 are withdrawn toward the center of the wheel whereby they are disengaged from the depressions 9 of the rim. When it is desired to secure a rim upon a wheel, the rim is placed in position upon the wheel and the locking member moved inwardly from the position indicated in dotted lines in Fig. 2. The initial inward movement of the locking member from the position just mentioned serves to project the pins 7 outwardly into the depressions 9 of the rim. The final movement of the locking member moves the toggle rods 10 inwardly beyond the plane of the axes of the pins thereby reversing the effect of the inward tendency of the pins upon the locking member 12 whereby said locking member tends to move inwardly. As above noted the locking member abuts the surface of the hub at a point where the toggle rods 10 are positioned inwardly of and beyond the axes of the pins, or beyond the toggle centers. Thus it will be seen that the locking member 12 is held against the hub of the wheel and the pins are locked in position thereby. As above mentioned the spring arms 15 are resilient and aid not only in compensating for various depths of the depressions 9 but also aid in locking the mechanism to secure the rim upon the wheel.

Having thus fully described my invention, I claim:—

1. In a device of the character described, the combination with a wheel and a demountable rim, of means disposed on opposite sides of the wheel for engagement with the rim, and a toggle mechanism connecting said oppositely disposed means, said toggle mechanism being adapted to abut a surface of said wheel when it is moved inwardly beyond its centers.

2. In a device of the character described, the combination with a wheel and a demountable rim, of means mounted about the periphery of the wheel for engagement with said rim to secure the same upon the wheel, a common locking member, and toggle connections between said locking member and said means, said locking member being adapted to move the toggle connections inwardly beyond their centers and to abut a surface of the wheel to lock said means in engagement with said rim.

3. In a device of the character described, the combination with a wheel and a demountable rim, of means mounted about the periphery of the wheel for engagement with said rim to secure the same upon the wheel, a common locking member having spring arms extending therefrom, and toggle connections between said spring arms and said first mentioned means, said locking member being adapted to move said toggle connections inwardly beyond their centers and to abut a surface of the wheel to lock said first mentioned means in engagement with said rim.

4. In a device of the character described, the combination with a wheel and a demountable rim, of a series of pins mounted upon the wheel and adapted to engage said rim to hold it on the wheel, a central spider having a toggle connection with each pin and adapted to move said toggle connections inwardly beyond their centers and to abut a surface of a wheel whereby the pins are locked in engagement with a rim.

5. In a device of the character described, the combination with a wheel and a demountable rim, of a series of pins movably mounted on the wheel and disposed radially at various points about the wheel and adapted to engage said rim to hold it on the wheel, a central spider formed with a series of lateral extending spring arms, and a toggle connection between said pins and respective spring arms, said spider being adapted to move said toggle connections inwardly beyond their centers and to abut a surface of the wheel whereby the pins are locked in engagement with the rim.

6. In a device of the character described, the combination with a spoked wheel and a demountable rim, means mounted on the felly of the wheel at various points around the same and disposed in the plane of the spokes and adapted to engage said rim to secure it upon the wheel, a central locking member having arms extending laterally thereof and adapted to extend into the plane of the spokes, and toggle connections between said means and respective arms of said locking member, said locking member being adapted to abut a surface of the wheel when said toggle connections are moved inwardly past their centers.

7. In a device of the character described, the combination with a spoked wheel and a demountable rim, means mounted on the felly of the wheel and various points upon the same and disposed in the plane of the spokes and adapted to engage said rim to secure it on the wheel, a central locking member having spring arms extending laterally thereof and adapted to extend into the plane of the spokes, toggle connections between said means and respective arms of said locking member, and a handle secured to said locking member, said locking member being adapted to abut a surface of the wheel when said toggle connections are moved inwardly past their centers.

In testimony whereof I affix my signature.

CYRIL NORTON OUTERBRIDGE.